United States Patent Office 3,132,122
Patented May 5, 1964

3,132,122
POLYMERIZATION OF NITRILE MONOMERS WITH VANADIUM COMPOUND OR FERRIC SULFATE AS CATALYSTS
Michael Dunay, Fanwood, and Herman D. Noether, Short Hills, N.J., assignors to Celanese Corporation of America, New York, N.Y., a corporation of Delaware
No Drawing. Filed Aug. 31, 1960, Ser. No. 53,037
23 Claims. (Cl. 260—85.5)

This invention relates to an improved method of polymerizing unsaturated nitriles.

Solid polymers of ethylenically unsaturated nitriles, e.g. acrylonitrile, suitable for formation into filaments and other shaped articles are well known in the art. The usual method of forming these polymers has been to subject an aqueous dispersion of the unsaturated nitrile to the action of a free radical yielding catalyst, e.g. a peroxide. It is generally preferred to use an aqueous system when employing peroxide catalysts because of the safety hazard which such catalysts present if the monomer is polymerized in bulk or in solution in an organic solvent. Molecular oxygen, e.g. in air, is generally excluded from the reaction zone because of the belief that it inhibits the polymerization reaction and/or results in thermally unstable polymers. The resulting aqueous dispersion of the polymer is treated to liberate the polymer from the water, emulsifying agent, thickener, and other agents which have been found to be desirable for polymerizing an aqueous dispersion. This separation requires various treatments involving operations such as coagulation, washing and drying to obtain a polymer which is pure enough to be formed into shaped articles. In many instances it would be preferable to avoid these operations associated with polymerizing an aqueous dispersion if a catalyst could be found which could be safely used in a bulk or solution polymerization system. Moreover, it would be desirable in some instances to carry out the polymerization without the exclusion of molecular oxygen.

It is an object of this invention to provide an improved process for the polymerization of unsaturated nitrile. It is a further object of this invention to provide a process of polymerizing unsaturated nitriles which avoids the necessity of using peroxide catalysts for which a system comprising an aqueous emulsion of the monomer is required. It is a still further object of this invention to provide a process of polymerizing an unsaturated nitrile in bulk or organic solvent solution which does not require the exclusion of molecular oxygen and which results in a reaction mass from which a purified polymer may be easily obtained.

In accordance with one aspect of the invention, an unsaturated nitrile either in bulk or dissolved in an organic solvent is contacted with a catalyst selected from the group consisting of sulfate of vanadium wherein the valence of the vanadium is at least +3, compounds of vanadium wherein the valence of the vanadium is at least +3, e.g. a vanadium trihalide or sulfate, complexed with a compound containing unshared electrons in the outermost shell of a relatively electronegative element such as oxygen, and ferric sulfate. Preferably the foregoing vanadium or ferric compound is the sole compound of a metal present in the catalyst. It has been found that the use of these catalysts results in the production of unsaturated nitrile polymers capable of being formed into shaped articles without the necessity of a peroxide type catalyst and the use of an aqueous emulsion polymerization system.

Compounds which contain unshared electrons in the outermost shell of a relatively electronegative element such as oxygen which form complexes with compounds of relatively electropositive elements such as boron and the transition metals are well known in the art. Some of these compounds which form complexes with the vanadium compounds of this invention are ethers, e.g. dialkyl ethers such as diethyl ether, ketones such as 4-heptanone and esters such as ethyl acrylate which may also act as a co-monomer with the unsaturated nitrile.

The preferred catalysts are vanadic sulfate alone, $V_2(SO_4)_3$, vanadyl sulfate alone, $VOSO_4$, a complex of a vanadium sulfate, vanadium trichloride, $VCl_3$, or vanadyl dichloride, $VOCl_2$, with diethyl ether alone or with water, and ferric sulfate, $Fe_2(SO_4)_3$. When diethyl ether or other organic oxygen-containing compound is used as a complexing catalyst component it may be present in any proportion and may even be used as a polymerization solvent or dispersion medium. A suitable range of the metallic compound component of the catalyst is 0.001 to 5%, preferably 0.01 to 1%, based on the weight of monomer.

The unsaturated nitrile is preferably acrylonitrile or methacrylonitrile. The unsaturated nitrile may also be copolymerized with a minor amount of one or more other comonomers. Some comonomers which may be used for example are ethyl acrylate, methyl methacrylate and vinyl pyrrolidone.

The polymerization reaction may be carried out under widely varying conditions of temperature and pressure. Room temperature and atmospheric pressure may be conveniently used in many instances. As stated previously, the polymerization may be of the monomer in bulk or of the monomer dissolved in an appropriate organic solvent. Where an organic solvent is used the resulting polymer may be either soluble or insoluble in the solvent. If the polymer is insoluble in the solvent it may be filtered from the solvent at the conclusion of the reaction and dried to obtain the solid polymer in particular form. If the polymer is soluble in the organic solvent the resulting polymer solution may be used directly in the formation of shaped articles such as filaments or films, or the solution may be for example, spray dried to obtain the polymer in finely divided form. The concentration of monomer in the solvent at the beginning of the polymerization reaction may be for example, in about 0.1 to 100% by weight of the solvent. Some specific solvents which may be used are for example the foregoing oxygen-containing complexing compounds, n-hexane, toluene, dimethyl formamide, dimethyl acetamide and alpha-valerolactone.

An important advantage of the catalysts of this invention is that they may be used in the presence of molecular oxygen such as that present in air. Thus, the polymerization will proceed even though there is a considerable proportion of oxygen in the vapor space of the reaction zone, e.g., up to or even above 20 mol. percent, which is the approximate amount of oxygen in air. This is in contrast to conventional peroxide-catalyzed polymerizations.

The following examples further illustrate the invention.

*Example I*

To a sample of 62.5 grams of acrylonitrile in a reaction vessel was added 0.2% of vanadium trichloride based on the weight of the monomer and 5 ml. of diethyl ether, all at room temperature. The polymerization reaction was allowed to proceed for three days at a temperature of 25° C. The resulting polymer after washing with methanol and drying, was found to have an inherent viscosity of 2.3 measured as 0.1% solution in dimethyl formamide at 25° C.

*Example II*

The procedure of Example I was repeated except that the catalyst was 0.2% of vanadic sulfate, $V_2(SO_4)_3$, and 5 ml. of diethyl ether. A thick slurry formed after 3 days which yielded a polymer having an inherent viscosity of 7.4.

*Example III*

The procedure of Example I was repeated except that the catalyst was 0.2% of vanadic sulfate with no ether. A thick slurry formed after 3 days which yielded a polymer having an inherent viscosity of 8.6 to 9.3.

*Example IV*

The procedure of Example I was followed except that the catalyst was 0.2% of vanadic sulfate based on the weight of the monomer and 0.1 ml. of water. A thick slurry formed after 3 days which yielded a polymer having an inherent viscosity of 6.5 to 6.3.

*Example V*

To 10 ml. of acrylonitrile in a reaction vessel were added 0.05 gram of vanadyl sulfate. The reaction continued for 14 days. A high yield of solid polymer was obtained.

*Example VI*

The procedure of Example V was repeated except that 0.5 ml. of diethyl ether were also added to the monomer. The polymerization reaction was continued for 2 hours. A high yield of solid polymer was obtained.

*Example VII*

To 62.5 grams of acrylonitrile in a reaction vessel were added 50 ml. of 4-heptanone all at room temperature, and 0.0625 gram of vanadium trichloride. Within 30 minutes a 90% yield of solid polyacrylonitrile was obtained which was filtered and washed with methanol to remove catalyst.

*Example VIII*

To 100 grams of acrylonitrile and 100 grams of ethyl acrylate in a reaction vessel was added 0.4 gram of vanadium trichloride followed by 20 ml. of diethyl ether. After 24 hours reaction time, a solid transparent copolymer had formed. The polymer was slowly dissolved in acetone, precipitated with water, washed with methanol and dried. The copolymer, which could be readily molded, had an inherent viscosity of 2.8 and was composed of about 50% of polymerized acrylonitrile and 50% polymerized ethyl acrylate as indicated by infra-red analysis.

The polymers of this invention may be formed into useful filaments, e.g. for the manufacture of textiles, unsupported films, and molded articles.

It is to be understood that the foregoing detailed description is given merely by way of illustration and that many variations may be made therein without departing from the spirit of our invention.

Having described our invention what we desire to secure by Letters Patent is:

1. A process of polymerizing an ethylenically unsaturated nitrile comprising contacting said unsaturated nitrile with from about 0.001 to about 5%, based upon the weight of monomer, of a catalyst consisting essentially of at least one member of the group consisting of:
   (a) vanadyl sulfate,
   (b) vanadic sulfate,
   (c) vanadium trihalides,
   (d) vanadyl dihalides,
   (e) complexes of the foregoing compounds with an organic compound in which oxygen is the donor atom, and
   (f) ferric sulfate.

2. The process of claim 1 wherein said ethylenically unsaturated nitrile is selected from the group consisting of acrylonitrile and methacrylonitrile.

3. The process of claim 2 wherein said unsaturated nitrile is polymerized in bulk.

4. The process of claim 2 wherein said unsaturated nitrile is polymerized in a solution comprising an organic solvent.

5. The process of claim 3 wherein said polymerization takes place in the presence of up to about 20 mole percent of molecular oxygen in the vapor space of the reaction zone.

6. A process of polymerizing acrylonitrile comprising contacting said acrylonitrile with from about 0.001 to about 5% based upon the weight of monomer of a catalyst consisting of vanadic sulfate.

7. Process of polymerizing acrylonitrile comprising contacting said acrylonitrile with from about 0.001 to about 5% based upon the weight of monomer of a catalyst consisting of vanadyl sulfate.

8. A process for the bulk polymerization of acrylonitrile comprising contacting said acrylonitrile with from about 0.001 to about 5% based upon the weight of a catalyst consisting essentially of vanadic sulfate.

9. A process for the bulk polymerization of acrylonitrile comprising contacting said acrylonitrile with from about 0.001 to about 5% based upon the weight of monomer of a catalyst consisting essentially of vanadyl sulfate.

10. A process of polymerizing ethylenically unsaturated nitriles comprising contacting said nitrile with from about 0.001 to about 5% based upon the weight of monomer of a catalyst consisting essentially of a complex of an organic compound, in which oxygen is the donor atom, with a member of the group consisting of vanadyl sulfate, vanadic sulfate, vanadium trihalides, and vanadyl dihalides.

11. The process of claim 10 wherein said complex is a dialkyl ether complex.

12. A proces for the bulk polymerization of acrylonitrile comprising contacting said acrylonitrile with from about 0.001 to about 5% based upon the weight of monomer of a catalyst consisting essentially of vanadic sulfate complexed with diethyl ether.

13. A process for the bulk polymerization of acrylonitrile comprising contacting said acrylonitrile with from about 0.001 to about 5% based upon the weight of monomer of a catalyst consisting essentially of vanadyl sulfate complexed with diethyl ether.

14. A process for the bulk polymerization of acrylonitrile comprising contacting said acrylonitrile with from about 0.001 to about 5% based upon the weight of monomer of a catalyst consisting essetnially of vanadic sulfate complexed with water.

15. A process for the bulk polymerization of acrylonitrile comprising contacting said acrylonitrile with from about 0.001 to about 5% based upon the weight of monomer of a catalyst consisting essentially of vanadium trichloride complexed with 4-heptanone.

16. A process for the bulk polymerization of acrylonitrile comprising contact said acrylonitrile with from about 0.001 to about 5% based upon the weight of monomer of a catalyst consisting essentially of vanadium trichloride complexed with diethyl ether.

17. A process of polymerizing acrylonitrile comprising contacting said acrylonitrile with from about 0.001 to about 5% based upon the weight of monomer of a catalyst consisting essentially of vanadium trichloride complexed with diethyl ether.

18. A process of polymerizing acrylonitrile comprising contacting said acrylonitrile with from about 0.001 to about 5% based upon the weight of monomer of a catalyst consisting essentially of vanadic sulfate complexed with diethyl ether.

19. A process of polymerizing acrylonitrile comprising contacting said acrylonitrile with from about 0.001 to about 5% based upon the weight of monomer of a catalyst consisting essentially of vanadic sulfate complexed with water.

20. A process of polymerizing acrylonitrile comprising contacting said acrylonitrile with from about 0.001 to about 5% based upon the weight of monomer of a catalyst consisting of vanadyl sulfate complexed with diethyl ether.

21. A process of polymerizing acrylonitrile comprising said acrylonitrile with from about 0.001 to about 5% based upon the weight of monomer of a catalyst consisting essentially of vanadium trichloride complexed with 4-heptanone.

22. A process of copolymerizing an ethylenically unsaturated nitrile selected from the group consisting of acrylonitrile and methacrylonitrile with a comonomer selected from the group consisting of ethyl acrylate, methyl methacrylate, and vinyl pyrrolidone, comprising contacting said monomers with from about 0.001 to about 5% based upon the weight of monomers of a catalyst consisting essentially of at least one member of the group consisting of:
(a) vanadyl sulfate,
(b) vanadic sulfate,
(c) vanadium trihalides,
(d) vanadyl dihalides,
(e) complexes of the foregoing compounds with an organic compound in which oxygen is the donor atom, and
(f) ferric sulfate.

23. A process for the bulk copolymerization of acrylonitrile and ethyl acrylate comprising contacting said monomers with from about 0.001 to about 5% based upon the weight of monomer of a catalyst consisting essentially of vanadium trichloride complexed with diethyl ether.

References Cited in the file of this patent
UNITED STATES PATENTS

| | | |
|---|---|---|
| 2,881,156 | Pilar et al. | Apr. 7, 1959 |
| 2,961,433 | Linn | Nov. 22, 1960 |
| 2,986,557 | Banks | May 30, 1961 |